United States Patent
Weng et al.

(10) Patent No.: US 11,092,282 B2
(45) Date of Patent: Aug. 17, 2021

(54) SUSPENSION HOLDING MECHANISM

(71) Applicant: Wistron NeWeb Corp., Hsinchu (TW)

(72) Inventors: Ping-You Weng, Hsinchu (TW); Yu-Shuo Wu, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 0 days.

(21) Appl. No.: 16/794,508

(22) Filed: Feb. 19, 2020

(65) Prior Publication Data
US 2021/0041061 A1  Feb. 11, 2021

(30) Foreign Application Priority Data

Aug. 6, 2019 (TW) ................................. 108127848

(51) Int. Cl.
*A47H 1/00* (2006.01)
*F16M 13/02* (2006.01)

(52) U.S. Cl.
CPC ........ *F16M 13/027* (2013.01); *F16M 13/022* (2013.01)

(58) Field of Classification Search
CPC .......... F16M 13/0207; F16F 1/12; F16F 1/14; E04B 9/245
See application file for complete search history.

(56) References Cited

U.S. PATENT DOCUMENTS

| | | | | | |
|---|---|---|---|---|---|
| 3,018,080 | A | * | 1/1962 | Loudon | E04B 9/006 248/228.4 |
| 3,589,660 | A | * | 6/1971 | Dunckel | F21V 21/02 248/343 |
| 3,780,973 | A | * | 12/1973 | Dalton, Jr. | E04B 9/006 248/342 |
| 6,345,800 | B1 | * | 2/2002 | Herst | E04B 9/006 248/342 |
| 8,549,810 | B1 | * | 10/2013 | Norton | E04B 9/245 52/506.06 |
| 10,161,565 | B2 | | 12/2018 | Wu | |
| 10,174,501 | B1 | * | 1/2019 | Underkofler | E04B 9/366 |

FOREIGN PATENT DOCUMENTS

TW  201804109 A  2/2018

* cited by examiner

*Primary Examiner* — Amy J. Sterling
(74) *Attorney, Agent, or Firm* — McClure, Qualey & Rodack, LLP (57) ABSTRACT

A suspension holding mechanism is provided. The suspension holding mechanism is adapted to mount an electronic device on a first ceiling structure or a second ceiling structure. The suspension holding mechanism includes a supporter and a holder. The holder is detachably connected to the supporter, wherein the holder includes a holder body, two first holding portions, and two second holding portions. The first holding portions are disposed on the holder body and are located on the first surface of the holder body. The second holding portions are disposed on the holder body and are located on the second surface of the holder body. In a first state, the first holding portions are connected to two sides of the first ceiling structure. In a second state, the second holding portions are connected to two sides of the second ceiling structure.

14 Claims, 13 Drawing Sheets

SUSPENSION HOLDING MECHANISM

CROSS REFERENCE TO RELATED APPLICATIONS

This application claims priority of Taiwan Patent Application No. 108127848, filed on Aug. 6, 2019, the entirety of which is incorporated by reference herein.

BACKGROUND OF THE INVENTION

Field of the Invention

The present invention relates to a suspension holding mechanism, and in particular to a suspension holding mechanism adapted to mount an electronic device on a ceiling structure.

Description of the Related Art

Wireless routers and similar electronic devices are commonly suspended on a ceiling via a suspension fastening mechanism. In particular, they are often suspended on a metal supporting structure in the ceiling. The metal supporting structure can be T-shaped beam or another type of metal supporting structure. There are many different types of metal supporting structures, however, and a single conventional suspension fastening mechanism cannot be attached to multiple types of metal supporting structure simultaneously, making it difficult to mount the electronic device (for example, a wireless router) to the ceiling.

BRIEF SUMMARY OF THE INVENTION

Embodiments of the inventions are provided to solve the difficulty above-mentioned. In one embodiment, a suspension holding mechanism is provided. The suspension holding mechanism is adapted to mount an electronic device to a first ceiling structure or a second ceiling structure. The suspension holding mechanism includes a supporter and a holder. The holder is detachably connected to the supporter, wherein the holder comprises a holder body, two first holding portions and two second holding portions, the first holding portions are disposed on the holder body and are located on a first surface of the holder body, and the second holding portions are disposed on the holder body and are located on a second surface of the holder body. The first ceiling structure has a first ceiling structure width, the second ceiling structure has a second ceiling structure width, the first ceiling structure width is shorter than the second ceiling structure width. In a first state, the first holding portions are connected to two sides of the first ceiling structure, and the supporter is connected to the second surface of the holder body. In a second state, the second holding portions are connected to two sides of the second ceiling structure, and the supporter is connected to the first surface of the holder body.

In one embodiment, the supporter has a supporter axis, the holder has a holder axis, and in the first state, the supporter axis is parallel to the holder axis, and the supporter axis is parallel to the first ceiling structure, and in the second state, the supporter axis is not parallel to the holder axis, and the supporter axis is parallel to the second ceiling structure.

In one embodiment, the supporter comprises a plurality of hooks, in the first state, the hooks are connected to the second holding portions, and in the second state, the hooks are connected to the first holding portions.

In one embodiment, the suspension holding mechanism further comprises at least one restriction bolt, wherein the holder body comprises at least one first restriction hole and at least one second restriction hole, and in the first state, the restriction bolt is connected to the first restriction hole to restrict the freedom of the holder relative to the supporter, and in the second state, the restriction bolt is connected to the second restriction hole to restrict the freedom of the holder relative to the supporter.

In one embodiment, in the first state, the restriction bolt tightly presses the first ceiling structure, and in the second state, the restriction bolt tightly presses the second ceiling structure.

In one embodiment, each hook comprises a hook connection portion, a hook base portion, a hook protrusion and a hook restriction recess, the hook base portion is connected to the hook connection portion, the hook protrusion is formed on the hook base portion, the hook restriction recess is formed on the hook base portion, and in the first state, the hook restriction recess corresponds to the first restriction hole, the restriction bolt is adapted to abut the hook restriction recess to restrict the freedom of the holder relative to the supporter, and in the second state, the hook connection portion is adjacent to the second restriction hole, and the restriction bolt is adapted to abut the hook connection portion to restrict the freedom of the holder relative to the supporter.

In one embodiment, an end of the hook protrusion has a first abutting edge, and in the first state, the hook protrusion overlaps the second holding portion, and the first abutting edge abuts an inner wall of the second holding portion.

In one embodiment, each first holding portion comprises a holding portion opening, the hook base portion has a second abutting edge formed on two sides of the hook protrusion, and in the second state, the hook protrusion passes through the holding portion opening, and the second abutting edge abuts an inner wall of the first holding portion.

In one embodiment, the hook base portion is substantially triangular, the hook restriction recess is formed on a first side of the hook base portion, the hook connection portion is connected to the first side, and the hook protrusion is formed on a second side of the hook base portion.

In one embodiment, the supporter has a supporter axis, the holder has a holder axis, and in the first state, the supporter axis is parallel to the holder axis, and the supporter axis is parallel to the first ceiling structure, and in the second state, the supporter axis is parallel to the holder axis, and the supporter axis is parallel to the second ceiling structure.

In one embodiment, the holder further comprises two first elastic holding portions, the first elastic holding portions are connected to the holder body, and in the first state, the first holding portions are connected to the two sides of the first ceiling structure, and the first elastic holding portions abut the two sides of the first ceiling structure.

In one embodiment, the holder further comprises two second elastic holding portions, the second elastic holding portions are connected to the second holding portions, and in the second state, the second holding portions are connected to the two sides of the second ceiling structure, and the second elastic holding portions abut the two sides of the second ceiling structure.

In one embodiment, each second elastic holding portion comprises an extending section and a holding section, the extending section connects the second holding portion to the holding section, the second holding portion and the holding section on different ends of the extending section abut the two sides of the second ceiling structure.

In one embodiment, the suspension holding mechanism further comprises at least one fastening bolt, wherein the fastening bolt affixes the holder body to the supporter.

Utilizing the suspension holding mechanism of the embodiments of the invention, the suspension holding mechanism can be combined with ceiling structures of different sizes by flipping the holder. The suspension holding mechanism of the embodiments of the invention has a simple structure, can be assembled easily, and has a lower cost.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
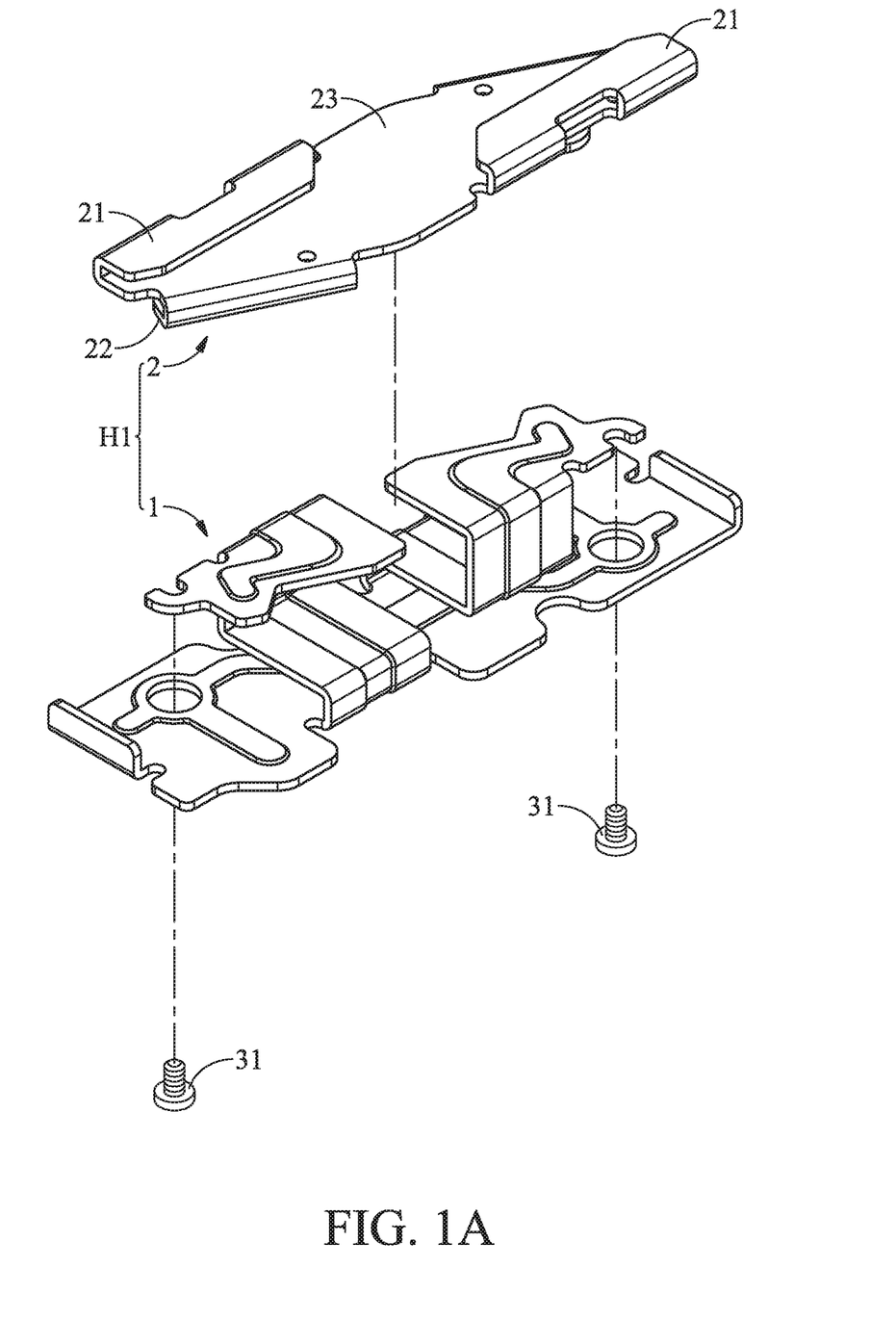
FIG. 1A is an exploded view of the suspension holding mechanism of the first embodiment of the invention.
Figure 1B:
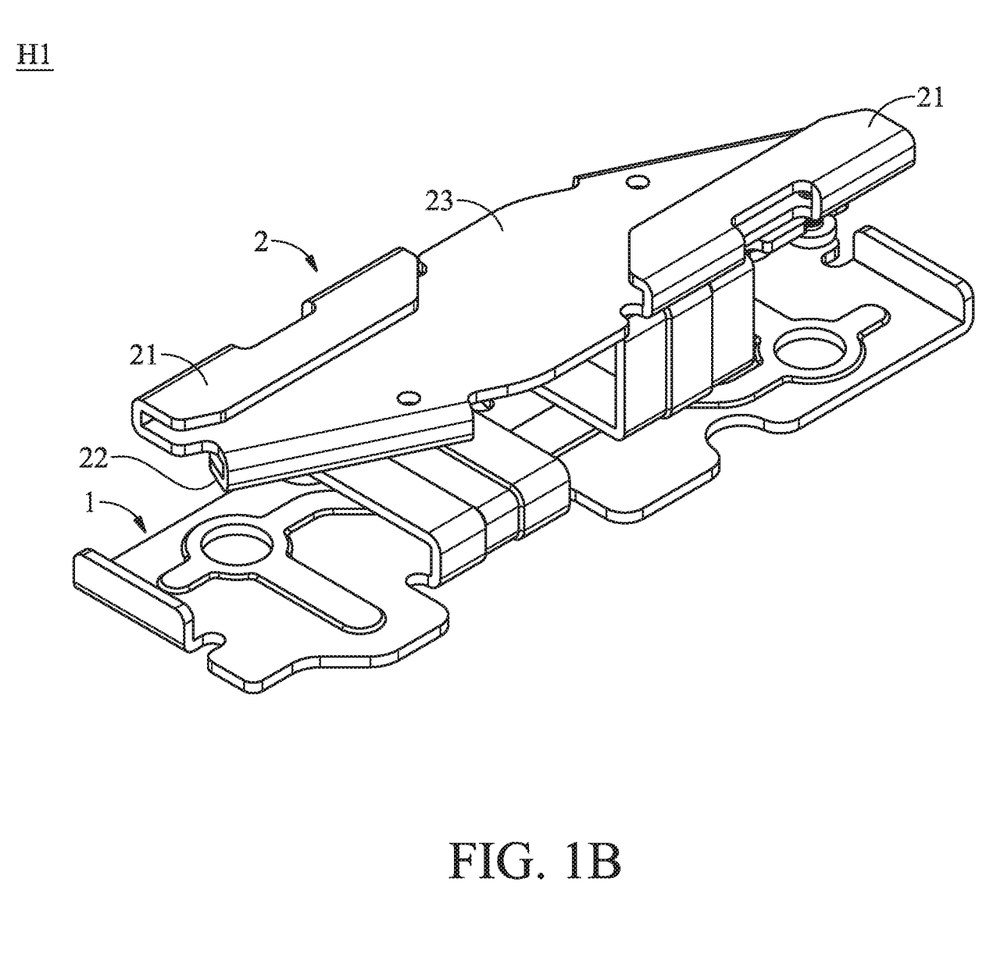
FIG. 1B is an assembled view of the suspension holding mechanism of the first embodiment of the invention.

FIG. 1A is an exploded view of the suspension holding mechanism of the first embodiment of the invention. FIG. 1B is an assembled view of the suspension holding mechanism of the first embodiment of the invention. With reference to FIGS. 1A and 1B, the suspension holding mechanism H1 of the embodiment of the invention is adapted to mount an electronic device (not shown) on a first ceiling structure or a second ceiling structure. The suspension holding mechanism H1 includes a supporter 1 and a holder 2. The holder 2 is detachably connected to the supporter 1. The holder 2 comprises a holder body 23, two first holding portions 21 and two second holding portions 22.

Figure 2A:
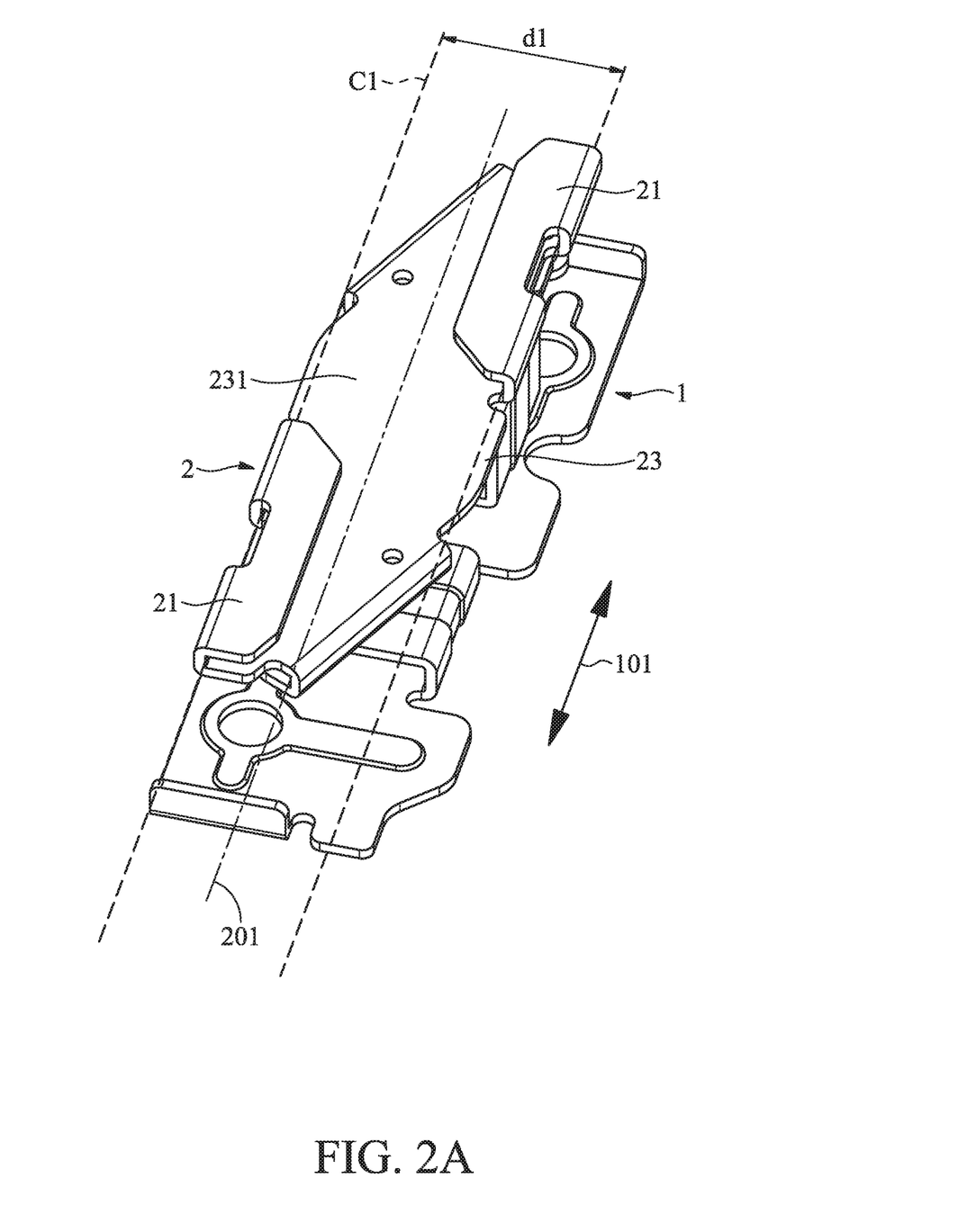
FIG. 2A shows the suspension holding mechanism of the embodiment of the invention combined to the first ceiling structure.
Figure 2B:
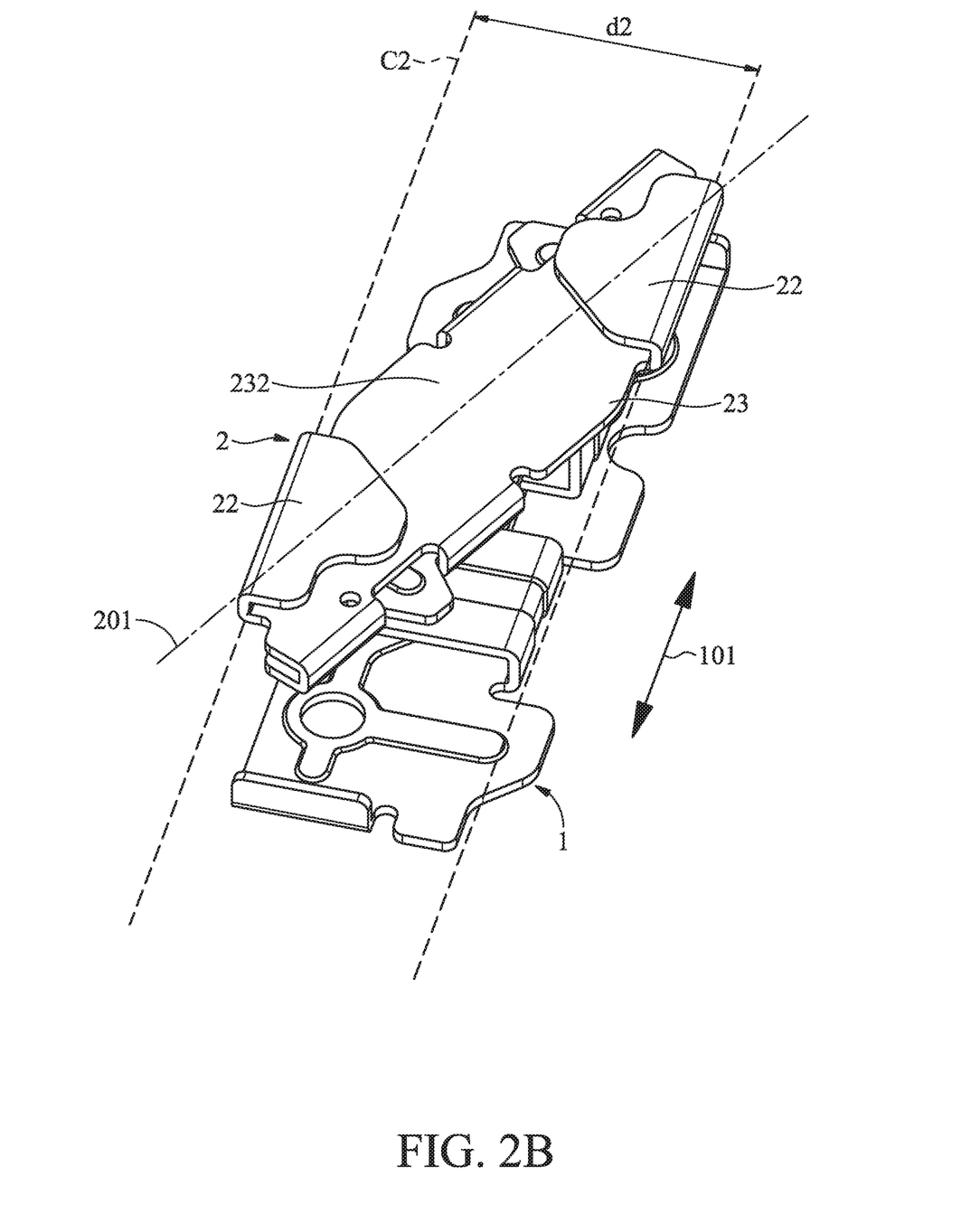
FIG. 2B shows the suspension holding mechanism of the embodiment of the invention combined to the second ceiling structure.

FIG. 2A shows the suspension holding mechanism H1 of the embodiment of the invention combined to the first ceiling structure C1. FIG. 2B shows the suspension holding mechanism H1 of the embodiment of the invention combined to the second ceiling structure C2. With reference to FIGS. 2A and 2B, the first holding portions 21 are disposed on the holder body 23 and are located on a first surface 231 of the holder body 23. The second holding portions 22 are disposed on the holder body 23 and are located on a second surface 232 of the holder body 23. The first ceiling structure C1 has a first ceiling structure width d1. The second ceiling structure C2 has a second ceiling structure width d2. The first ceiling structure width d1 is shorter than the second ceiling structure width d2. In a first state (FIG. 2A), the first holding portions 21 are connected to two sides of the first ceiling structure C1, and the supporter 1 is connected to the second surface 232 of the holder body 23. In a second state (FIG. 2B), the second holding portions 22 are connected to two sides of the second ceiling structure C2, and the supporter 1 is connected to the first surface 231 of the holder body 23.

In this embodiment, the first surface 231 is opposite to the second surface 232. By rotating the holder 2, the suspension holding mechanism H1 can be combined to the ceiling structures of different sizes.

With reference to FIGS. 2A and 2B, in one embodiment, the supporter 1 has a supporter axis 101, and the holder 2 has a holder axis 201. In the first state (FIG. 2A), the supporter axis 101 is parallel to the holder axis 201, and the supporter axis 101 is parallel to the first ceiling structure C1. In the second state (FIG. 2B), the supporter axis 101 is not parallel to the holder axis 201, and the supporter axis 101 is parallel to the second ceiling structure C2.

Figure 3:
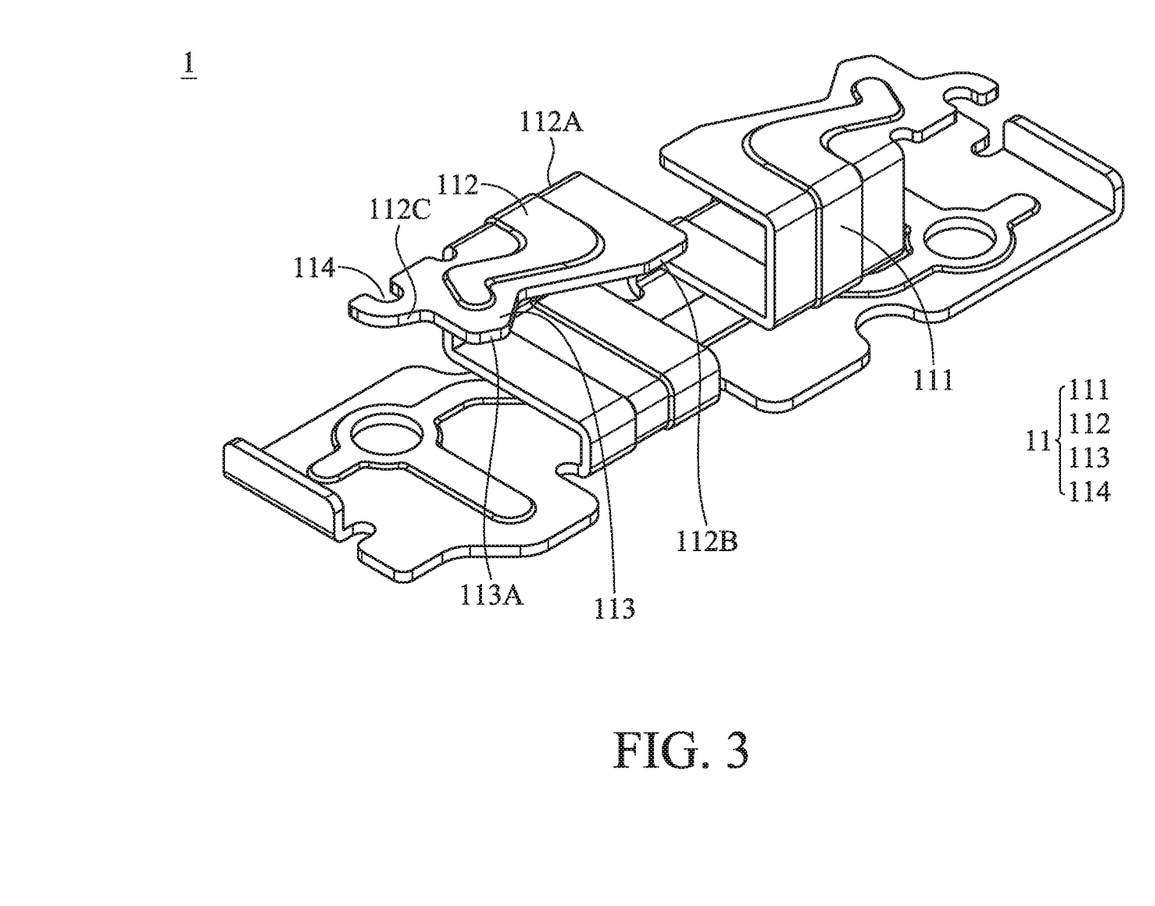
FIG. 3 shows the details of the supporter of the first embodiment of the invention.
Figure 4A:
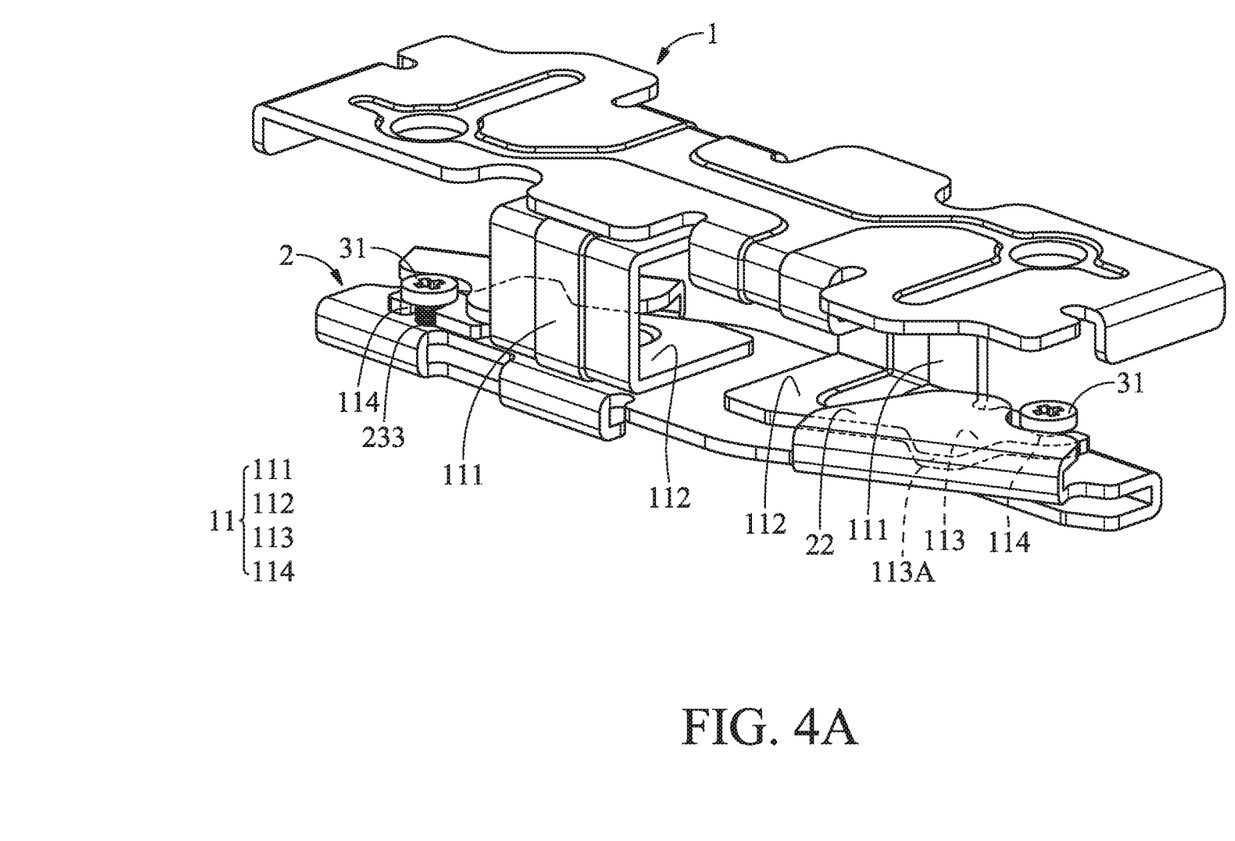
FIG. 4A shows the supporter being combined to the holder of the first embodiment of the invention, wherein the suspension holding mechanism is in the first state.
Figure 4B:
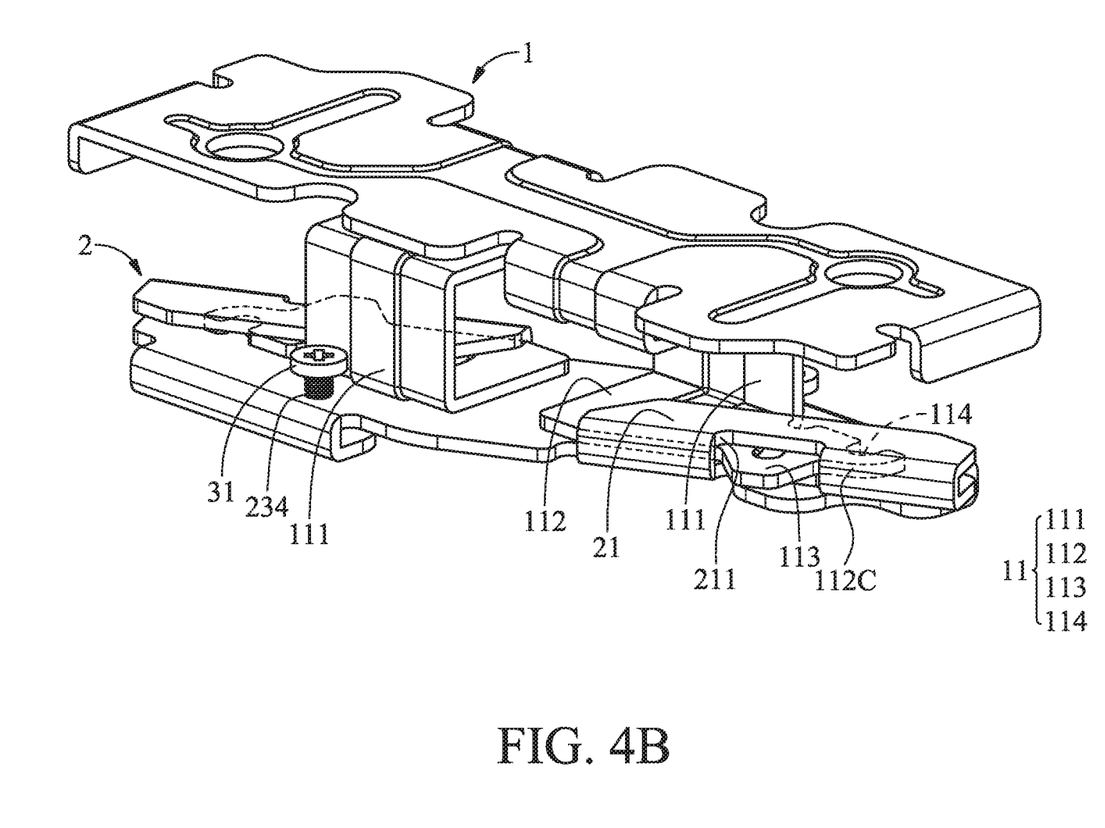
FIG. 4B shows the supporter being combined to the holder of the first embodiment of the invention, wherein the suspension holding mechanism is in the second state.

FIG. 3 shows the details of the supporter 1 of the first embodiment of the invention. FIG. 4A shows the supporter being combined to the holder of the first embodiment of the invention, wherein the suspension holding mechanism is in the first state. FIG. 4B shows the supporter being combined to the holder of the first embodiment of the invention, wherein the suspension holding mechanism is in the second state. With reference to FIGS. 3, 4A and 4B, in this embodiment, the supporter 1 comprises a plurality of hooks 11. In the first state, the hooks 11 are connected to the second holding portions 22 (FIG. 4A). In the second state, the hooks 11 are connected to the first holding portions 21 (FIG. 4B).

With reference to FIGS. 4A and 4B, in one embodiment, the suspension holding mechanism H1 further comprises at least one restriction bolt 31. The holder body 23 comprises at least one first restriction hole 233 and at least one second restriction hole 234. In the first state (FIG. 4A), the restriction bolt 31 is connected to the first restriction hole 233 to restrict the freedom of the holder 2 relative to the supporter 1. In the second state (FIG. 4B), the restriction bolt 31 is connected to the second restriction hole 234 to restrict the freedom of the holder 2 relative to the supporter 1.

Figure 4C:
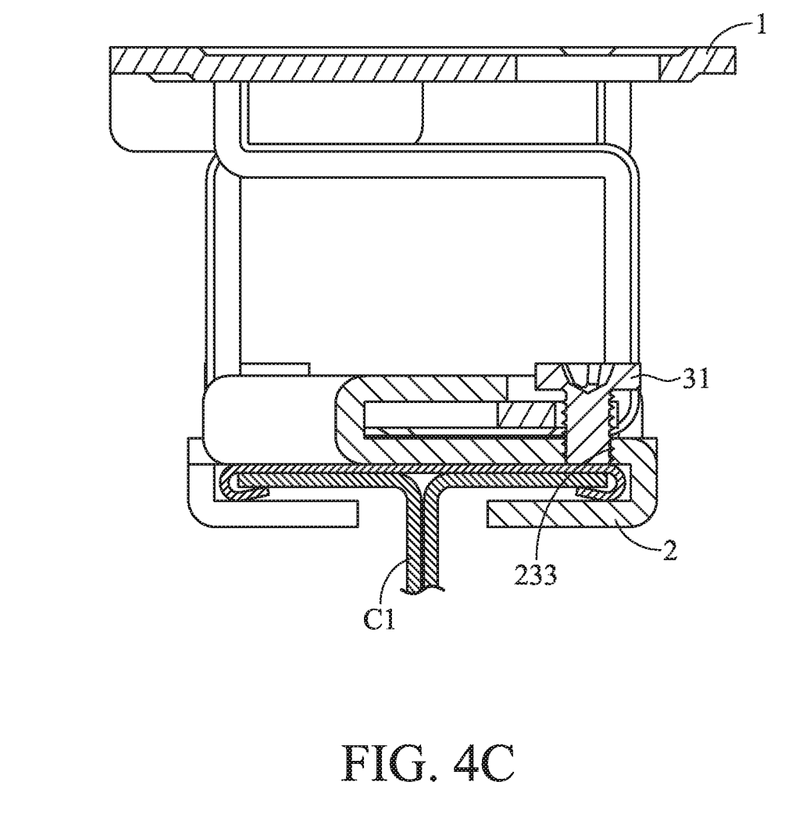
FIG. 4C shows the position of the restriction bolt of the first embodiment of the invention, wherein the suspension holding mechanism is in the first state.
Figure 4D:
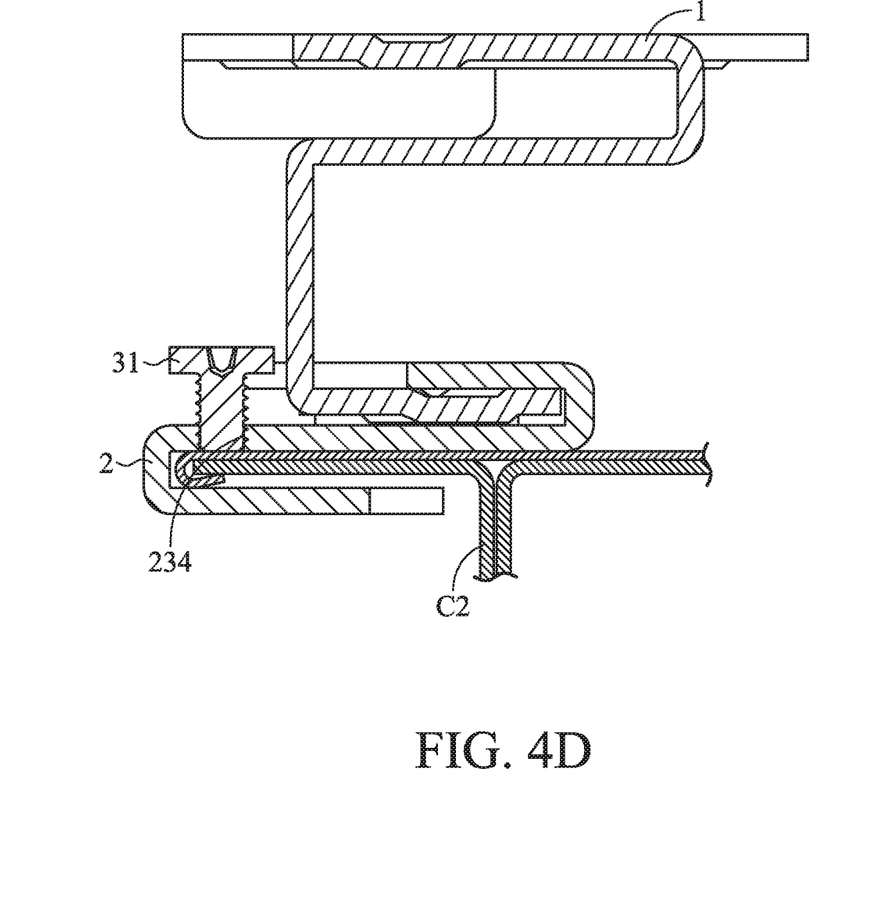
FIG. 4D shows the position of the restriction bolt of the first embodiment of the invention, wherein the suspension holding mechanism is in the second state.

With reference to FIGS. 4C and 4D, in one embodiment, in the first state (FIG. 4C), the restriction bolt 31 tightly presses the first ceiling structure C1. In the second state (FIG. 4D), the restriction bolt 31 tightly presses the second ceiling structure C2.

With reference to FIG. 3, in one embodiment, each hook 11 comprises a hook connection portion 111, a hook base portion 112, a hook protrusion 113 and a hook restriction recess 114. The hook base portion 112 is connected to the hook connection portion 111. The hook protrusion 113 is formed on the hook base portion 112. The hook restriction recess 114 is formed on the hook base portion 112. With reference to FIG. 4A, in the first state, the hook restriction recess 114 corresponds to the first restriction hole 233, and the restriction bolt 31 is adapted to abut the hook restriction recess 114 to restrict the freedom of the holder 2 relative to the supporter 1. With reference to FIG. 4B, in the second state, the hook connection portion 111 is adjacent to the second restriction hole 234, and the restriction bolt 31 is adapted to abut the hook connection portion 111 to restrict the freedom of the holder 2 relative to the supporter 1.

With reference to FIGS. 3 and 4A, in one embodiment, an end of the hook protrusion 113 has a first abutting edge 113A. In the first state (FIG. 4A), the hook protrusion 113 overlaps the second holding portion 22, and the first abutting edge 113A abuts an inner wall of the second holding portion 22. Therefore, the holder 2 can be stably combined with the supporter 1.

With reference to FIGS. 3 and 4B, in one embodiment, each first holding portion 21 comprises a holding portion opening 211. The hook base portion 112 has a second abutting edge 112C formed on two sides of the hook protrusion 113. In the second state, the hook protrusion 113 passes through the holding portion opening 211. The second abutting edge 112C abuts an inner wall of the first holding portion 21. Therefore, the holder 2 can be stably combined with the supporter 1.

With reference to FIG. 3, in one embodiment, the hook base portion 112 is substantially triangular. The hook restriction recess 114 is formed on a first side 112A of the hook base portion 112. The hook connection portion 111 is connected to the first side 112A. The hook protrusion 113 is formed on a second side 112B of the hook base portion 112.

In the first embodiment of the invention, by rotating the holder 2 relative to the first ceiling structure C1, the first holding portions 21 are connected to the two sides of the first ceiling structure C1. By rotating the holder 2 relative to the second ceiling structure C2, the second holding portions 22 are connected to the two sides of the second ceiling structure C2. In other words, in this embodiment, by rotating the holder relative to the ceiling structure, the holder is combined with the ceiling structure.

Figure 5A:
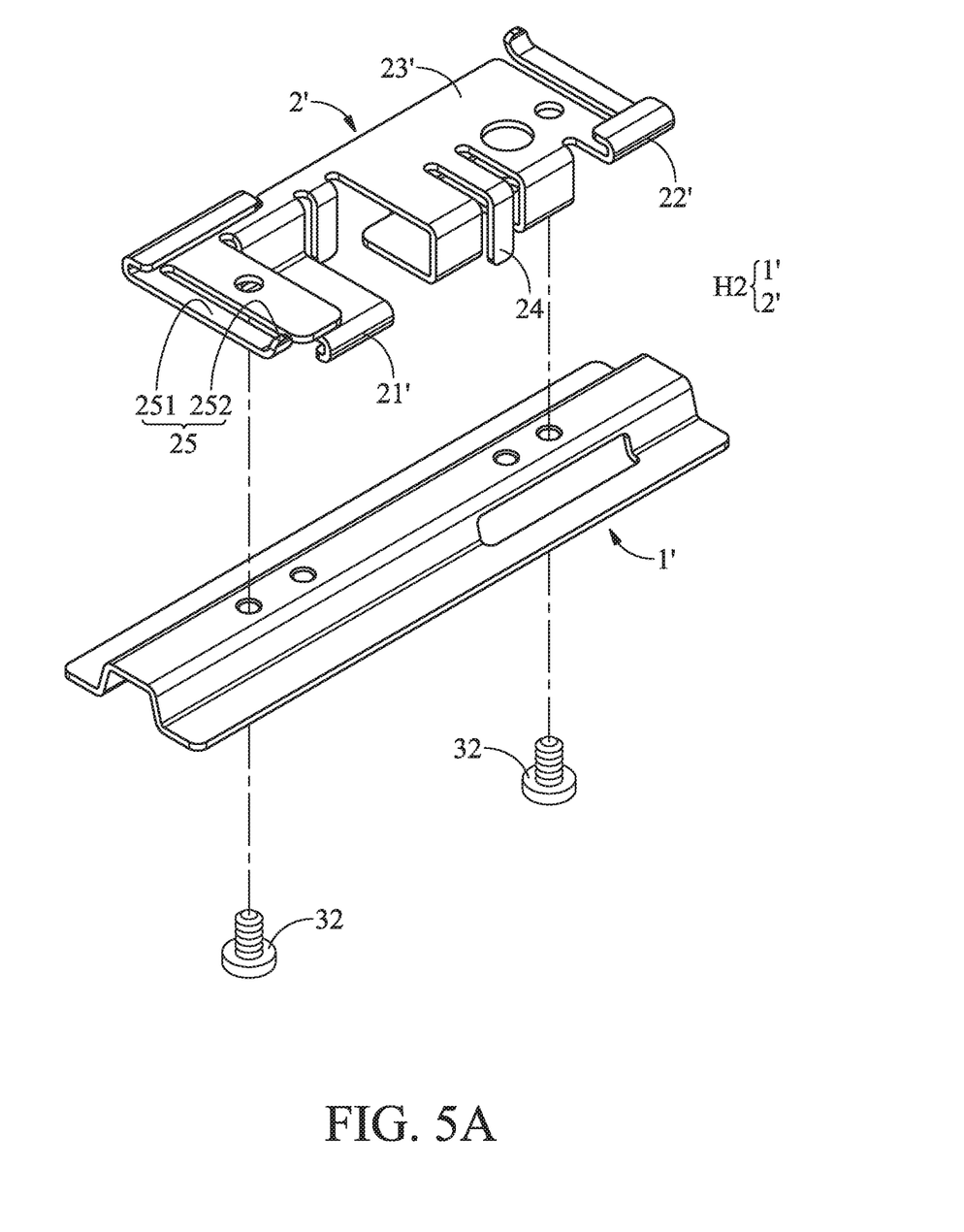
FIG. 5A is an exploded view of the suspension holding mechanism of the second embodiment of the invention.
Figure 5B:
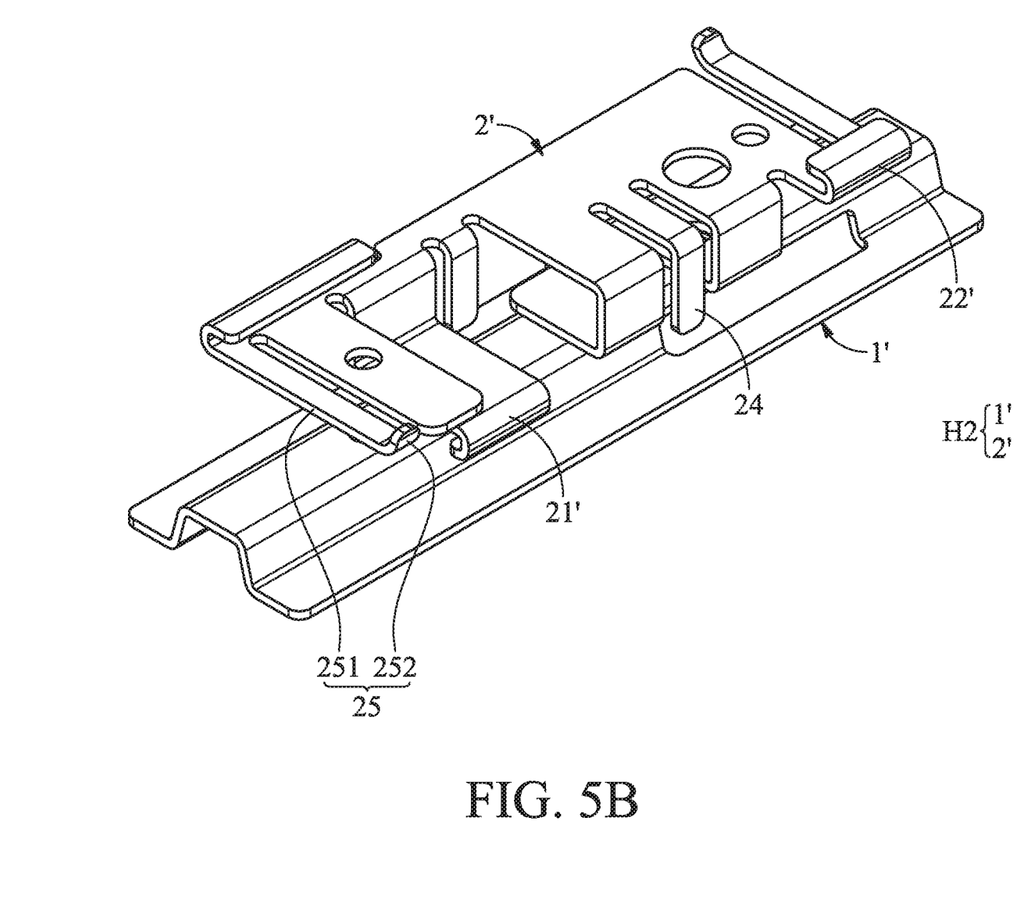
FIG. 5B is an assembled view of the suspension holding mechanism of the second embodiment of the invention.
Figure 6A:
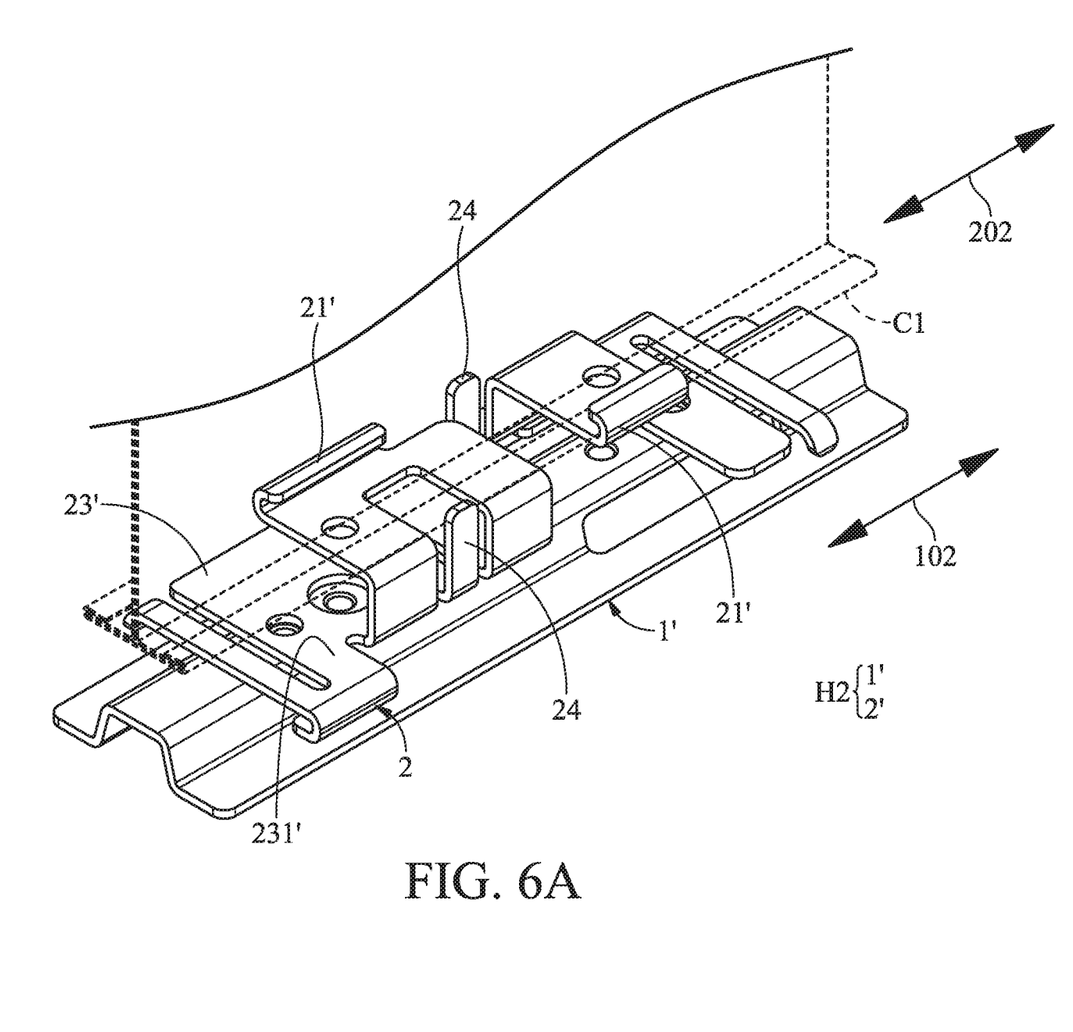
FIG. 6A shows the suspension holding mechanism of the second embodiment of the invention combined to the first ceiling structure.
Figure 6B:
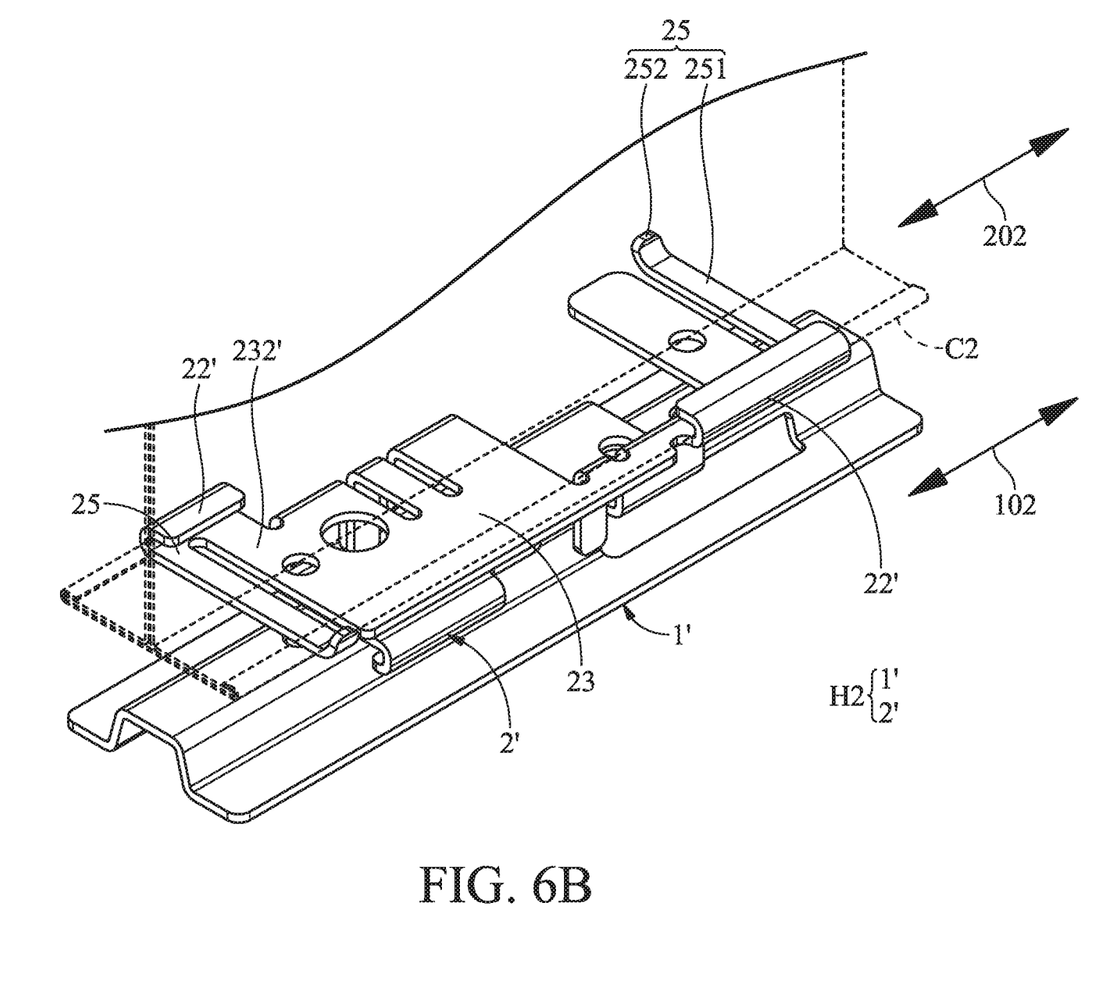
FIG. 6B shows the suspension holding mechanism of the second embodiment of the invention combined to the second ceiling structure.

FIG. 5A is an exploded view of the suspension holding mechanism of the second embodiment of the invention. FIG. 5B is an assembled view of the suspension holding mechanism of the second embodiment of the invention. FIG. 6A shows the suspension holding mechanism H2 of the second embodiment of the invention combined to the first ceiling structure C1. FIG. 6B shows the suspension holding mechanism H2 of the second embodiment of the invention combined to the second ceiling structure C2. With reference to FIGS. 5A, 5B, 6A and 6B, in this embodiment, the suspension holding mechanism H2 includes a supporter 1' and a holder 2'. The holder 2' is detachably connected to the supporter 1'. The holder 2' comprises a holder body 23', two first holding portions 21' and two second holding portions 22'. The first holding portions 21' are disposed on the holder body 23' and are located on a first surface 231' of the holder body 23'. The second holding portions 22' are disposed on the holder body 23' and are located on a second surface 232' of the holder body 23'.

With reference to FIGS. 6A and 6B, in one embodiment, the supporter 1' has a supporter axis 102, and the holder 2' has a holder axis 202. In the first state (FIG. 6A), the supporter axis 102 is parallel to the holder axis 202. The supporter axis 102 is parallel to the first ceiling structure C1. In the second state (FIG. 6B), the supporter axis 102 is parallel to the holder axis 202, and the supporter axis 102 is parallel to the second ceiling structure C2.

With reference to FIG. 6A, in one embodiment, the holder 2' further comprises two first elastic holding portions 24. The first elastic holding portions 24 are connected to the holder body 23'. In the first state, the first holding portions 21' are connected to the two sides of the first ceiling structure C1, and the first elastic holding portions 24 abut the two sides of the first ceiling structure C1. By the elastic design of the first elastic holding portions 24, the holder 2' can directly be mounted to the first ceiling structure C1, or directly detached from the first ceiling structure C1.

With reference to FIG. 6B, in one embodiment, the holder 2' further comprises two second elastic holding portions 25. The second elastic holding portions 25 are connected to the second holding portions 22'. In the second state, the second holding portions 22' are connected to the two sides of the second ceiling structure C2, and the second elastic holding portions 25 abut the two sides of the second ceiling structure C2. By the elastic design of the second elastic holding portions 25, the holder 2' can directly be mounted to the second ceiling structure C2, or directly detached from the second ceiling structure C2.

With reference to FIGS. 6A and 6B, in one embodiment, each second elastic holding portion 25 comprises an extending section 251 and a holding section 252. The extending section 251 connects the second holding portion 22' to the holding section 252. The second holding portion 22' and the holding section 252 on different ends of the extending section 251 abut the two sides of the second ceiling structure C2.

With reference to FIGS. 5A and 5B, in one embodiment, the suspension holding mechanism H2 further comprises at least one fastening bolt 32, wherein the fastening bolt 32 affixes the holder body 23' to the supporter 1'.

Utilizing the suspension holding mechanism of the embodiments of the invention, the suspension holding mechanism can be combined with ceiling structures of different sizes by flipping the holder. The suspension holding mechanism of the embodiments of the invention has a simple structure, can be assembled easily, and has a lower cost.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A suspension holding mechanism, adapted to mount an electronic device on a first ceiling structure or a second ceiling structure, comprising:
    a supporter; and
    a holder, detachably connected to the supporter, wherein the holder comprises a holder body, two first holding portions and two second holding portions, wherein the holder body has a first side and a second side, and the first side is opposite to the second side, the first holding portions are disposed on the holder body and are located on the first side of the holder body, and the second holding portions are disposed on the holder body and are located on the second side of the holder body,
    wherein the first ceiling structure has a first ceiling structure width, the second ceiling structure has a second ceiling structure width, the first ceiling structure width is shorter than the second ceiling structure width,
    wherein in a first state, the first holding portions are connected to two sides of the first ceiling structure, and the supporter is connected to the second side of the holder body,
    wherein in a second state, the second holding portions are connected to two sides of the second ceiling structure, and the supporter is connected to the first side of the holder body.

2. The suspension holding mechanism as claimed in claim 1, wherein the supporter has a supporter axis, the holder has a holder axis, and in the first state, the supporter axis is parallel to the holder axis, and the supporter axis is parallel to the first ceiling structure, and in the second state, the supporter axis is not parallel to the holder axis, and the supporter axis is parallel to the second ceiling structure.

3. A suspension holding mechanism, adapted to mount an electronic device on a first ceiling structure or a second ceiling structure, comprising:
    a supporter; and
    a holder, detachably connected to the supporter, wherein the holder comprises a holder body, two first holding portions and two second holding portions, the first holding portions are disposed on the holder body and are located on a first surface of the holder body, and the second holding portions are disposed on the holder body and are located on a second surface of the holder body,
    wherein the first ceiling structure has a first ceiling structure width, the second ceiling structure has a second ceiling structure width, the first ceiling structure width is shorter than the second ceiling structure width,
    wherein in a first state, the first holding portions are connected to two sides of the first ceiling structure, and the supporter is connected to the second surface of the holder body,
    wherein in a second state, the second holding portions are connected to two sides of the second ceiling structure, and the supporter is connected to the first surface of the holder body,
    wherein the supporter has a supporter axis, the holder has a holder axis, and in the first state, the supporter axis is parallel to the holder axis, and the supporter axis is parallel to the first ceiling structure, and in the second state, the supporter axis is not parallel to the holder axis, and the supporter axis is parallel to the second ceiling structure,
    wherein the supporter comprises a plurality of hooks, in the first state, the hooks are connected to the second holding portions, and in the second state, the hooks are connected to the first holding portions.

4. The suspension holding mechanism as claimed in claim 3, further comprising at least one restriction bolt, wherein the holder body comprises at least one first restriction hole and at least one second restriction hole, and in the first state, the restriction bolt is connected to the first restriction hole to restrict the freedom of the holder relative to the supporter, and in the second state, the restriction bolt is connected to the second restriction hole to restrict the freedom of the holder relative to the supporter.

5. The suspension holding mechanism as claimed in claim 4, wherein in the first state, the restriction bolt tightly presses the first ceiling structure, and in the second state, the restriction bolt tightly presses the second ceiling structure.

6. The suspension holding mechanism as claimed in claim 4, wherein each hook comprises a hook connection portion, a hook base portion, a hook protrusion and a hook restriction recess, the hook base portion is connected to the hook connection portion, the hook protrusion is formed on the hook base portion, the hook restriction recess is formed on the hook base portion, and in the first state, the hook restriction recess corresponds to the first restriction hole, the restriction bolt is adapted to abut the hook restriction recess to restrict the freedom of the holder relative to the supporter, and in the second state, the hook connection portion is adjacent to the second restriction hole, and the restriction bolt is adapted to abut the hook connection portion to restrict the freedom of the holder relative to the supporter.

7. The suspension holding mechanism as claimed in claim 6, wherein an end of the hook protrusion has a first abutting edge, and in the first state, the hook protrusion overlaps the second holding portion, and the first abutting edge abuts an inner wall of the second holding portion.

8. The suspension holding mechanism as claimed in claim 6, wherein each first holding portion comprises a holding portion opening, the hook base portion has a second abutting edge formed on two sides of the hook protrusion, and in the second state, the hook protrusion passes through the holding portion opening, and the second abutting edge abuts an inner wall of the first holding portion.

9. The suspension holding mechanism as claimed in claim 6, wherein the hook base portion is substantially triangular, the hook restriction recess is formed on a first side of the hook base portion, the hook connection portion is connected to the first side, and the hook protrusion is formed on a second side of the hook base portion.

10. The suspension holding mechanism as claimed in claim 1, wherein the supporter has a supporter axis, the holder has a holder axis, and in the first state, the supporter axis is parallel to the holder axis, and the supporter axis is parallel to the first ceiling structure, and in the second state, the supporter axis is parallel to the holder axis, and the supporter axis is parallel to the second ceiling structure.

11. The suspension holding mechanism as claimed in claim 10, wherein the holder further comprises two first elastic holding portions, the first elastic holding portions are connected to the holder body, and in the first state, the first holding portions are connected to the two sides of the first ceiling structure, and the first elastic holding portions abut the two sides of the first ceiling structure.

12. The suspension holding mechanism as claimed in claim 11, wherein the holder further comprises two second elastic holding portions, the second elastic holding portions are connected to the second holding portions, and in the second state, the second holding portions are connected to the two sides of the second ceiling structure, and the second elastic holding portions abut the two sides of the second ceiling structure.

13. The suspension holding mechanism as claimed in claim 12, wherein each second elastic holding portion comprises an extending section and a holding section, the extending section connects the second holding portion to the holding section, the second holding portion and the holding section on different ends of the extending section abut the two sides of the second ceiling structure.

14. The suspension holding mechanism as claimed in claim 12, further comprising at least one fastening bolt, wherein the fastening bolt affixes the holder body to the supporter.

\* \* \* \* \*